(12) United States Patent
Bjerke et al.

(10) Patent No.: US 7,047,616 B2
(45) Date of Patent: May 23, 2006

(54) METHOD OF MANUFACTURING AND LAYING A PLURALITY OF ELONGATE ELEMENTS TO THE OUTSIDE OF A CORE ELEMENT

(75) Inventors: Bjorn Bjerke, Rolvsoy (NO); Per Aage Kristensen, Tistedal (NO); Lars Tangen, Halden (NO)

(73) Assignee: Nexans, Paris (FR)

( * ) Notice: Subject to any disclaimer, the term of this patent is extended or adjusted under 35 U.S.C. 154(b) by 210 days.

(21) Appl. No.: 10/732,823

(22) Filed: Dec. 10, 2003

(65) Prior Publication Data

US 2004/0148752 A1 Aug. 5, 2004

(51) Int. Cl.
B21D 39/03 (2006.01)
B23P 21/00 (2006.01)

(52) U.S. Cl. .......................... 29/429; 29/779
(58) Field of Classification Search .............. 29/429, 29/782, 779, 755, 870, 728, 600, 455.1, 450, 29/453, 510, 516, 520, 428, 890.144; 405/156, 405/157, 177; 140/71 R; 333/244; 228/17.7, 228/903; 138/112
See application file for complete search history.

(56) References Cited

U.S. PATENT DOCUMENTS 2,724,944 A * 11/1955 Carleton et al. ............. 57/311
3,106,815 A * 10/1963 Granval et al. ................ 57/13
3,400,737 A * 9/1968 Matthews et al. .......... 138/111
4,530,205 A * 7/1985 Seiler et al. .................... 57/9
4,979,296 A 12/1990 Langner et al. ........ 29/890.144

* cited by examiner

Primary Examiner—John C. Hong
(74) Attorney, Agent, or Firm—Sofer & Haroun, LLP

(57) ABSTRACT

In a method of manufacturing and laying a plurality of elongate elements into an umbilical comprising a core element, a plurality of conduits of metal and if necessary at least one cable situated outside the core element, which core element is advanced along a feed line and the conduits and the cables are fed onto the outside of the core element and laid in a helix, a first group of single lengths of metal tubes forming the conduits are provided parallel one to another, the single lengths are advanced in the direction of the feed line, a second group of single lengths of metal tubes are provided parallel one to another, the lengths of the second group are advanced in the direction of the feed line and the first ends of the lengths of the second group are welded to the second end of the lengths of the first group, further groups of single lengths of metal tubes are provided and welded to the lengths of the foregoing group respective by, the metal tubes welded together are laid to the outside of the core element in the form of a helix in the same working step in which they are welded together, that the single lengths of each group are advanced into a receptacle (4a, 4b) having a tube like form, and that the receptacle is moved into the feed line and takes up said center core.

17 Claims, 4 Drawing Sheets

METHOD OF MANUFACTURING AND LAYING A PLURALITY OF ELONGATE ELEMENTS TO THE OUTSIDE OF A CORE ELEMENT

RELATED APPLICATIONS

This application is related to and claims the benefit of priority from Norwegian Patent Application 2002 5936, filed on Dec. 11, 2002, the entirety of which is incorporated herein by reference.

BACKGROUND OF THE INVENTION

From EP-B-0 627 027 there is known a method of manufacturing and laying a plurality of elongate elements to the outside of a core element. The core element, which may be a tube or a bundle of tubes and/or cables is advanced along a feed line. The elongate elements which are metal tubes and if needed cables are fed onto outside of the core element and laid in a helix. The metal tubes as well as the cables have been coiled to drums, which drums are spaced apart around the core element and are rotatable about the core element for helical laying thereon. Rotation of the drums about the core element is slow, when long lengths of metal tubes have been coiled to the drums, as the total weight of the drums causes high centrifugal forces. Therefore this method is very slow. Another draw-back of the known method is that each metal tube has to be coiled on a drum. If the length of the metal tubes supplied by the tubemaker is much shorter than the umbilical, the needed tube length has to be produced for each conduit of the umbilical. This is a time consuming process.

OBJECT AND SUMMARY OF THE INVENTION

According to the present invention a method of the type described in the above introduction is provided which method is characterized in that a first group of single lengths of metal tubes forming the conduits are provided parallel one to another, that the single lengths are advanced in the direction of the feed line, that a second group of single lengths of metal tubes are provided parallel one to another, that the lengths of the second group are advanced in the direction of the feed line and the first ends of the lengths of the second group are welded to the second ends of the lengths of the first group, that further groups of single lengths of metal tubes are provided and welded to the lengths of the foregoing group respectively, that the metal tubes welded together are laid to the outside of the core element in the form of a helix in the same working step in which they are welded together, and that the single lengths of each group (one or several groups) are advanced into a receptacle having a tube like form, which receptacle is moved into the feed line and takes up said core element The main advantage of the invention is that it is no longer necessary to spool the welded metal tubes on drums.

A further advantage is that the lead time is reduced by 60% and the machine time is reduced by 70% compared to the known method due to less operations. The reduced lead time can reduce the material storage cost.

Another advantage is that the production speed is higher than the production speed of the known method.

Increasing the number of metal tubes or changing the kind of metal tubes (different diameter) requires minor modifications compared to the known method.

Advantageously there is a first and a second receptacle the first being in the feed line and the second being parallel thereto beneath the feed line and single lengths are loaded to the second receptacle while group(s) of single lengths are taken out of the first receptacle.

Advantageously each receptacle may house more than one group of single lengths for increasing the time between each stop, for change between the first and second receptacle and thus improving the productivity of the machine.

Advantageously each group may contain more than one tube size according to the actual cable design.

Advantageously to avoid mixing of tubes, each tube is by barcode marking given a unique number which is before welding automatic checked by the machine computer system against a list of correct numbers.

If the wrong tube has been advanced, the operation is topped for corrective actions.

Advantageously each receptacle has a tube-like form with a plurality of tube like housings therein and each single length is fed into a housing with high velocity. The receptacles are moved sidewards or turned around an axis parallel to the feed line.

Advantageously group(s) of single lengths taken from the receptacle being in the feed line are welded to former group(s) of the lengths which are in the process of being laid to the outside of the core element by means of a travelling welding unit.

The helically laying of the metal tubes to the outside of the core element is advantageously effected by turning the receptacle around its central axis. Testing the welding joints is done immediately after the welding in the same working step.

Advantageously the metal tubes are laid to the outside of the core element with spaces between the metal tubes.

The metal tubes are preformed immediately before they are laid to the outside of the center core. Preforming is done in such a way that the curvature of the metal tubes is nearly equal to the curvature of the outside of the center core. Possibly filler elements are laid into the spaces between the metal tubes and/or the cables.

A tape may be wound to the layer comprising metal tubes, cables and if needed filler elements and a layer of bituminous material may be applied and at least one threadlike element is wound onto the layer of bituminous material.

Advantageously the receptacle to which the single lengths are loaded is turned around its longitudinal axis after the loading of each single length.

At last a sheath of thermoplastic material may be applied.

The sheath is applied in a separate working step and before applying the sheath the metal tubes are leak proved.

BRIEF DESCRIPTION OF THE DRAWINGS

In the following a preferred embodiment of the invention will be described with reference to the appended drawings, where.

DETAILED DESCRIPTION

Figure 1:
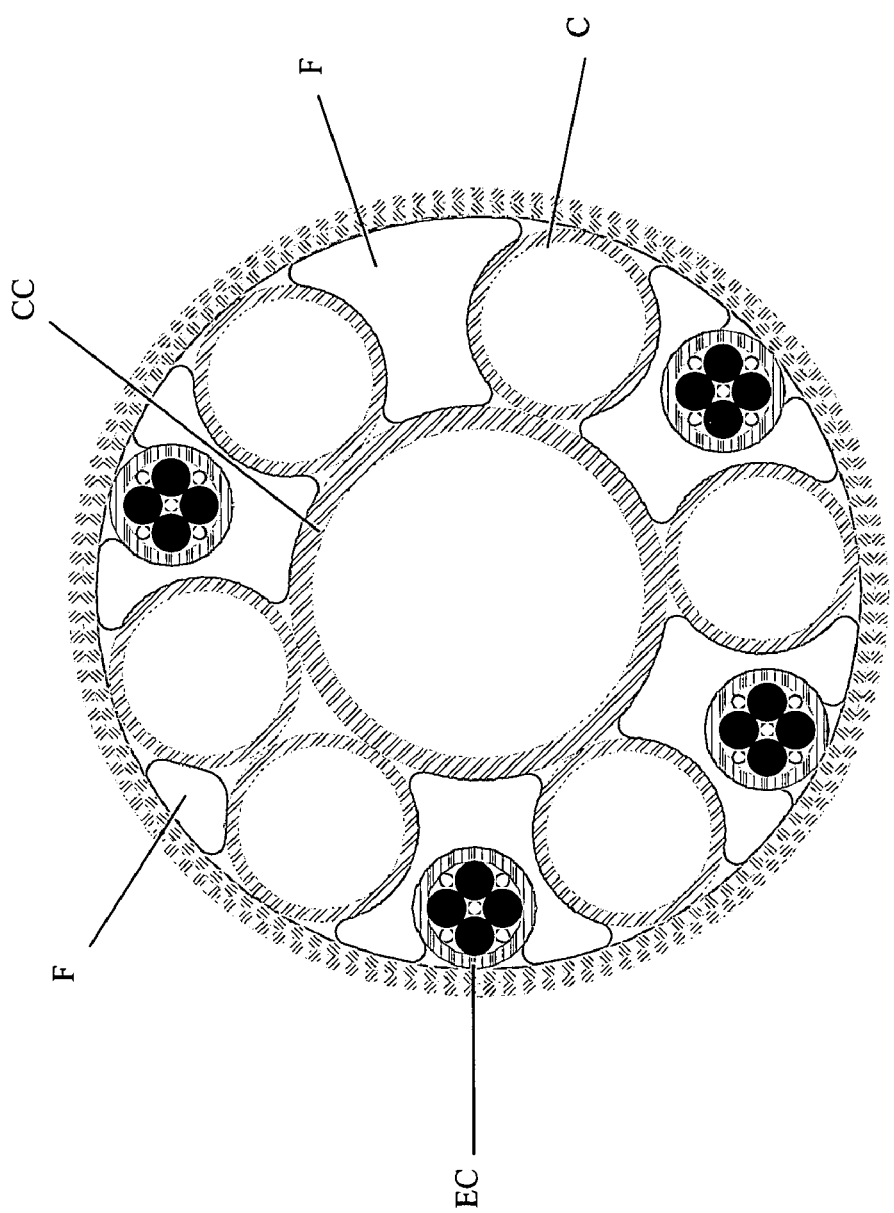
FIG. 1 is a schematic transverse sectional view of an umbilical showing its construction.
Figure 2:
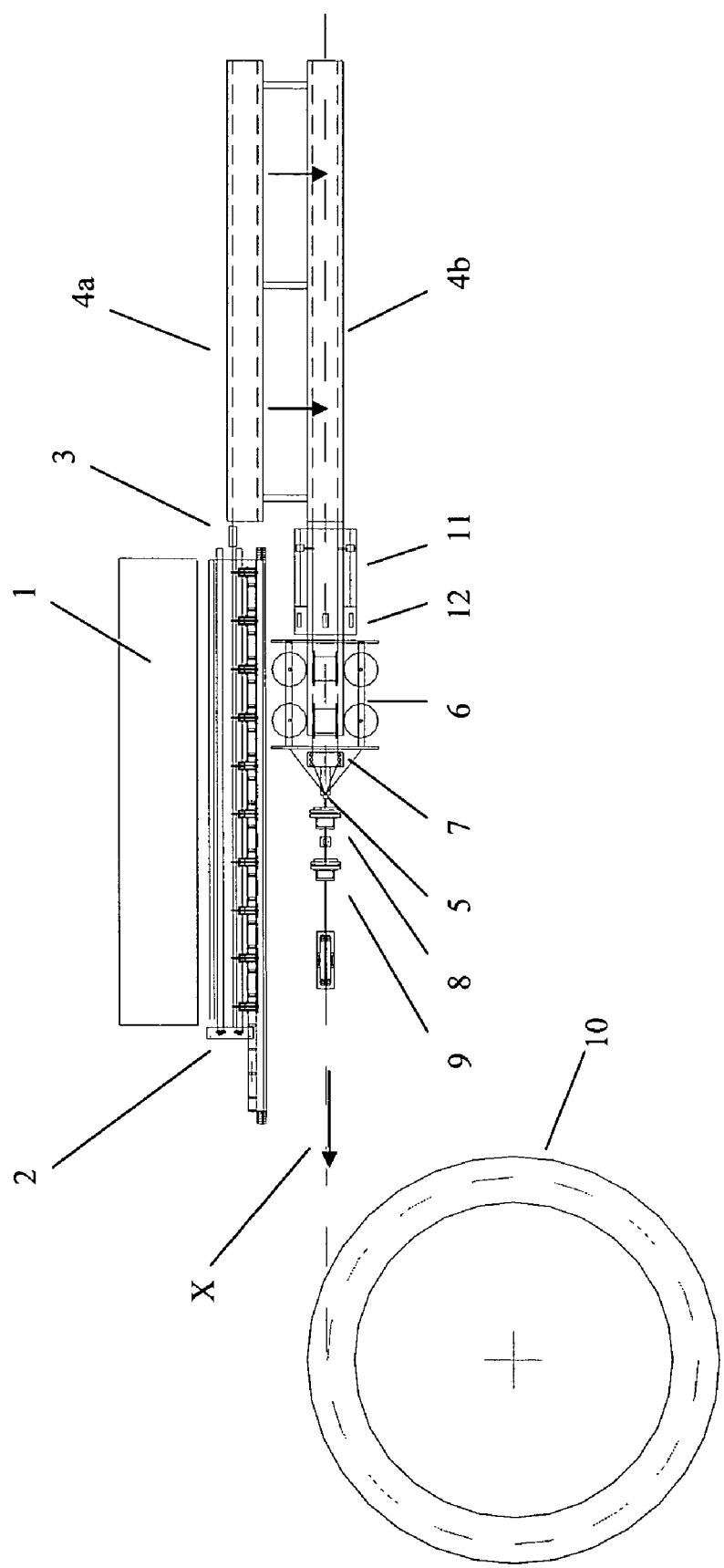
FIG. 2 is a schematic view of a machine for manufacturing of the umbilical.

We refer first to FIG. 1 showing the cable cord or "umbilical" to be produced with the machine shown in FIG. 2.

A steel tube forms the center core element CC. This is designed to transport chemicals such as methanol, for example, for injection into a well. Instead of the steel tube the center core may be formed by an electrical cable or a bundle of electrical cables not shown.

On the outside of core element CC lie a plurality of conduits C and electrical cables EC. The number of conduits C and cables EC may vary according to need, and in certain applications the cables can be omitted. The cables EC can contain optical fibres.

The interstices between the conduits and the cables may be filled with filler elements F, which are made of compressible material as polyethylene or foam.

The conduits C the cables EC and the fillers F are stranded with a long lay to the outside of the core element CC.

The electrical cables EC are used for transmitting electrical signals while the conduits C are flow lines for hydraulic fluids.

An outer protective sheath which is not shown consists of polyethylene that has been extruded onto the umbilical. Alternatively the sheath may be made of polyurethane or other thermoplastic material.

We now refer to FIG. 2 to describe the construction of the machine and the method of producing an umbilical as shown in FIG. 1.

Several lengths of metal tubes, which will form the conduits C in the umbilical are supplied from the tube maker and fed into a tube storage 1. The tube lengths each of which has a length of about 40 m are fed into a device 2, where the tube ends are prepared for welding and where the tubes are sorted.

A feeding device 3 loads the metal tubes into a receptacle 4a and 4b, which in the following will be called turret spindles. Loading of the turret spindle 4a is done with high speed.

Figure 3:
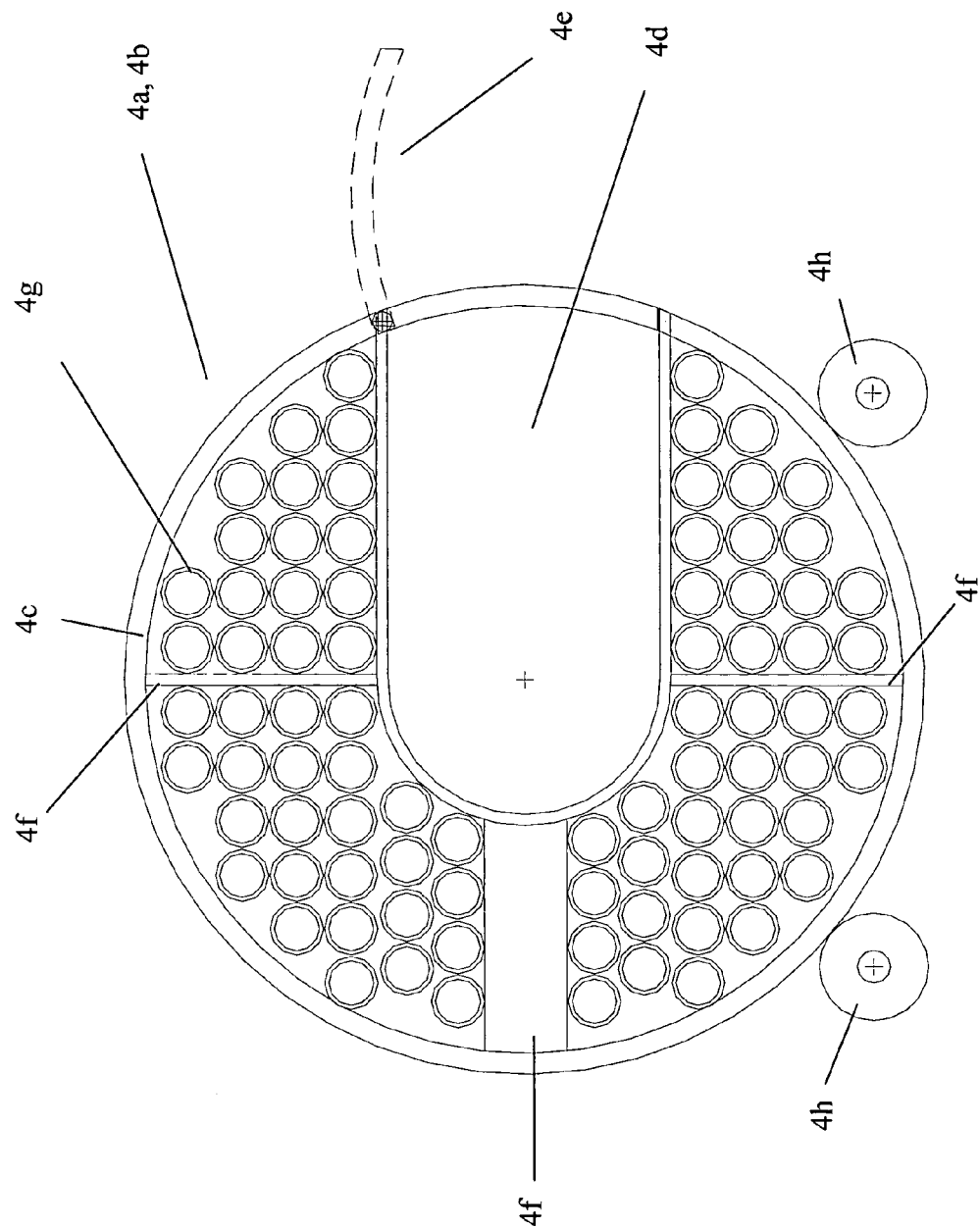
FIG. 3 is a schematic transverse sectional view of a receptacle

As shown in FIG. 3 the turret spindle 4a has a tube-like cross section with a tube-like shell 4c, a slot 4d and a closure means 4e.

The interior of the turret spindle 4a is divided in several sections by partition walls 4f. In the sections there are a plurality of tube-like housings 4g. The purpose of the partition walls 4f is mechanical protection and stiffening.

The turret spindle 4a is rotationally driven by driving wheels 4h.

The metal tube lengths are fed into the housings 4g, which are made of polyethylene or other materials with low friction coefficient, as the metal tubes rotate in the housings 4g as will described later. The turret spindle 4a rotates one step for each metal tube during loading.

Figure 4:
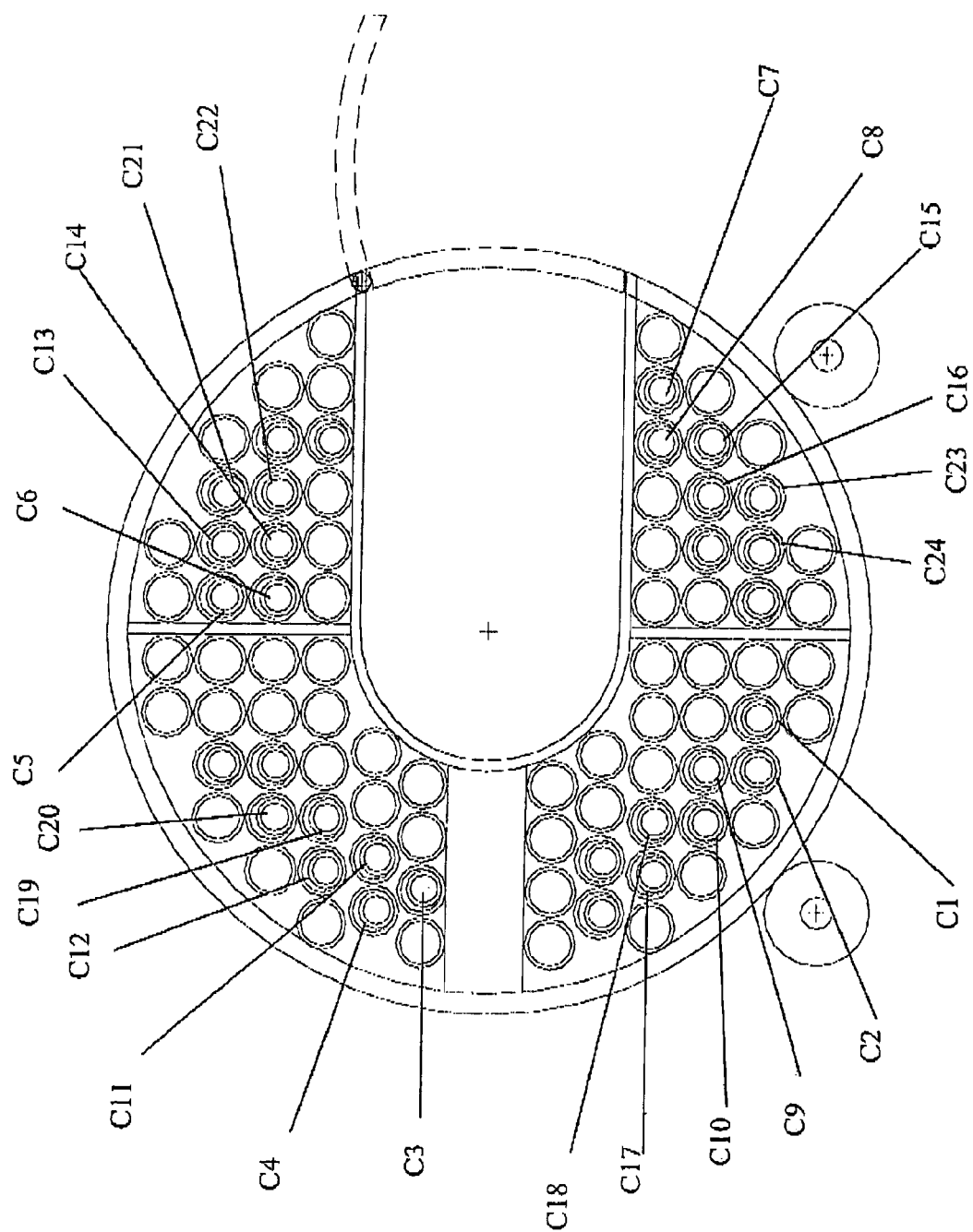
FIG. 4 is a schematic transverse sectional view of how more than one group of single tube lengths may be organised inside the receptacle.

The turret spindle may contain more than one group of single tube lengths for more effective and less time consuming operation during welding and helically laying of the tubes. If the first group contains the tubes C1–C8, the two next groups C9–C16 and C17–C24 may be loaded into the turret spindle as indicated in FIG 4. The turret spindle is filled up in the same way for the next groups but within a certain radius from the centre of the turret spindle to maintain optimum alignment to the former tubes during welding.

The turret spindle 4a after loading is moved sidewards on rails in the floor (not shown) into the feed line X.

The core element CC, which may be a metal tube, a cable or a bundle of cables is drawn off continuously from a drum and brought into the feed line X. The full turret spindle 4a is moved into the feed line X thereby taking up the core element CC in its slot 4d and the closure means 4e closes the slot 4d.

The groups of metal tubes C according to the actual cable design are then pulled out from the turret spindle 4a one by one or at the same time and are guided to a stranding die 5. By rotating the turret spindle 4a the tubes C are laid up to the outside of the core element CC in a helical form. When the first group of tubes have been pulled out of the turret spindle, the line is stopped and the turret is moved one step to align for the next group of tubes which are pulled out and spliced to the first group of tubes. This sequence continues until the turret spindle is empty.

A rotating cage 6 for electrical cables EC, fillers F and if needed optical fibre cables rotates outside the turret spindle 4a and feeds these elements into the same stranding die 5 enabling manufacture of different umbilical cable cores in the same manufacturing line. Between this stranding cage 6 and the stranding die 5 a preforming equipment 7 is installed to form the helix of the tubes and to rotate the tubes helically into the stranding die 5.

After the stranding die 5 an applicator for filling compound 8, tape wrapping 9, applicator for bitumen and a device for yarn wrapping are installed in line.

The finished umbilical core is spooled directly on a drum or a turn table 10, depending on size and length. The umbilical core is high pressure tested on the drum or turntable 10.

While the turret spindle 4a is emptied a second turret spindle 4b, which has the same form as the turret spindle 4a is loaded with groups of metal tubes as described before. This second turret spindle 4b is moved sidewards into the feed line whereas the first turret spindle 4a is moved out of the feed line X just enough to be lifted by a not shown crane over the full turret spindle 4b.

Now groups of tubes according to the actual cable design from the turret spindle 4b are pushed out of the turret spindle 4b and against the ends of the metal tubes of the first turret.

Between the turret spindles and the stranding cage 6 there is a welding unit comprising a plurality of bar code readers, welding automats 11 and testing devices 12. Here the tubes which may be of different size and length are welded together. For each tube there is one welding automat. The welding automats may be resistance welding automats, TIG welding automats, induction welding automats or laser welding automats.

Each welding device on the welding automat 11 is running on rails to be able to operate along the tubes of different length. The welding devices which contain barcode readers are automatically checking for correct tube number and positioned for welding by not shown positioning sensors well known in the art. All the tubes are welded together in a parallel welding operation. After welding, all the welds are tested by x-ray method in the same time. The testing method uses one x-ray source in the centre of the production line and one camera for each weld in the circumference around the tubes or to measure each tube by one or more cameras during rotation of the tubes in the welding area. A computer system takes care of the welding operation with testing and stores all process settings for each tube type, registration of test results and records all tube numbers from barcodes for backtracking. A PLC system controls all the sequences and drives in the line and communicates with the line computer which reports and records reasons for stop and quality deviations.

When the turret spindle 4b is emptied the turret spindle 4a loaded in the meantime replaces the spindle 4b and the process described before is repeated.

The invention claimed is:

1. A method of manufacturing and laying a plurality of elongate elements into an umbilical having a core element, a plurality of metal conduits and at least one cable situated outside the core element, said core element being advanced along a feed line said conduits and cables being fed onto the outside of the core element and laid in a helix, said method comprising the steps of:

providing a first group of single lengths of metal tubes forming said conduits, parallel one to another, so as to advance said single lengths in the direction of said feed line;

providing a second group of single lengths of metal tubes, parallel one to another, so as to advance said lengths of said second group in the direction of said feed line;

welding said first ends of said lengths of said second group to said second end of said lengths of said first group;

providing further groups of single lengths of metal tubes and welding said further groups to the lengths of the foregoing group respectively such that the metal tubes, welded together, are laid to the outside of said core element in the form of a helix in the same working step in which they are welded together;

advancing said single lengths of each group into a receptacle having a tube like form; and moving said receptacle into said feed line and taking up said core element.

2. Method according to claim 1, further comprising the step of employing a first and a second receptacle, the first receptacle being in the feed line and the second receptacle being parallel thereto, beneath the feed line;

loading said single lengths to said second receptacle while at least one group of said single lengths are removed from said first receptacle.

3. Method according to claim 1, wherein each said receptacle has a tube like form, said method further comprising the step of feeding said single lengths into said tube like forms at a high velocity.

4. Method according to claim 1, further comprising the step of housing more than one group of said single lengths in each receptacle.

5. Method according to claim 1, wherein each said group contains more than one tube size according to the cable design.

6. Method according to claim 1, further comprising the step of giving a unique number to each tube by barcode marking and automatically checking said unique number by a machine computer system against a list of correct numbers before welding.

7. Method according to claim 1, further comprising the step of moving said receptacles either sidewards or turned around an axis parallel to the feed line.

8. Method according to claim 1, further comprising the step of welding by means of a travelling welding unit the group of single lengths, taken from the receptacle, being in the feed line, to the former group(s) of lengths which are in the process of being laid to the outside of the core element.

9. Method according to claim 1, further comprising the step of turning the receptacle around its central axis so as to helically lay said metal tubes to the outside of said core element.

10. Method according to claim 1, further comprising the step of testing the welded joints immediately after the welding in the same working step.

11. Method according to claim 1, further comprising the steps of laying the metal tubes to the outside of said core element with spaces between them and, laying said cables into said spaces between said metal tubes.

12. Method according to claim 1, wherein the welding of said metal tubes is preformed immediately before they are laid to the outside of said core element.

13. Method according to claim 1, further comprising the step of laying filler elements into the spaces between said metal tubes and/or said cables.

14. Method according to claim 1, winding a tape to the layer comprising of metal tubes, cables and, if needed, filler elements and applying a layer of bituminous material and winding at last a threadlike element onto said layer of bituminous material.

15. Method according to claim 1, further comprising the step of turning, around its longitudinal axis, the receptacle, to which the single lengths are loaded after the loading of a single length.

16. Method according to claim 1, further comprising the step of applying a sheath of thermoplastic material to said metal tubes.

17. Method according to claim 16, further comprising the step of leak-proofing said metal tubes prior to applying said sheath.

* * * * *